United States Patent [19]
Tanaka et al.

[11] Patent Number: 5,689,655
[45] Date of Patent: Nov. 18, 1997

[54] APPARATUS FOR CONNECTING AND DISCONNECTING DRIVES UNDER ACTIVE STATE

[75] Inventors: Hiroyuki Tanaka; Masahide Kanegae, both of Kawasaki, Japan

[73] Assignee: Fujitsu Limited, Kawasaki, Japan

[21] Appl. No.: 777,398

[22] Filed: Dec. 27, 1996

Related U.S. Application Data

[63] Continuation of Ser. No. 341,759, Nov. 18, 1994, abandoned.

[30] Foreign Application Priority Data

Apr. 18, 1994 [JP] Japan .................. 6-078950

[51] Int. Cl.⁶ .................................................. G06F 13/00
[52] U.S. Cl. .................................. 395/283; 326/30
[58] Field of Search ...................... 395/283, 280; 326/30

[56] References Cited

U.S. PATENT DOCUMENTS

| | | | |
|---|---|---|---|
| 4,808,853 | 2/1989 | Taylor | 307/473 |
| 4,890,271 | 12/1989 | Stohs | 369/24 |
| 5,142,594 | 8/1992 | Sugishima | 382/56 |
| 5,192,883 | 3/1993 | Kimura | 307/475 |
| 5,285,512 | 2/1994 | Duncan et al. | 385/94 |
| 5,317,697 | 5/1994 | Husak et al. | 395/325 |
| 5,432,916 | 7/1995 | Hahn et al. | 395/283 |

*Primary Examiner*—Ayaz R. Sheikh
*Attorney, Agent, or Firm*—Greer, Burns & Crain, Ltd.

[57] ABSTRACT

An apparatus for connecting and disconnecting a plurality of drives connected in parallel with respect to a data transmission line in a magnetic disk system, etc., to and from the data transmission line under an active state, has data communication terminals provided for each of the drives, so as to be connected to the data transmission line and disconnected from the data transmission line; and units for fixing the levels at the data communication terminals when the data communication terminals are open. Preferably, the units for fixing the levels includes resistors connected between the data communication terminals and a ground, the resistance of each of the resistors being determined not to disturb an impedance of the data transmission line.

9 Claims, 12 Drawing Sheets

APPARATUS FOR CONNECTING AND DISCONNECTING DRIVES UNDER ACTIVE STATE

RELATED APPLICATION

This is a continuation of application Ser. No. 08/341,759, filed on Nov. 18, 1994 now abandoned.

BACKGROUND OF THE INVENTION

1. Field of the Invention

The present invention relates to an apparatus for connecting and disconnecting drive modules to and from a data transmission line under an active state, in a storage unit such as a magnetic disk unit (i.e., a magnetic disk system) in a computer system.

More particularly, the present invention relates to a technique for connecting and disconnecting at least one of the drive modules under an active state which are connected in parallel with the data transmission line, without affecting the operations of the other drives.

2. Description of the Related Art

Here, to enable some features and disadvantages regarding a conventional storage system, e.g., a conventional magnetic disk system, which has a function for connecting and disconnecting drive modules under an active state to and from a data transmission line, to be understood more clearly, a concrete configuration of a magnetic disk system of the prior art will be explained with reference to FIGS. 1 through 3.

FIG. 1 is a block diagram showing a magnetic disk system for a computer system according to the prior art. As shown in FIG. 1, the system includes drive modules (hereinafter referred to as "drives") 10a to 10h, which are connected to a string controller 5 through respective data transmission lines 50 separated from each other. The string controller 5 is connected to a magnetic disk controller 6. Each of the data transmission lines has a terminating resistor 4 for adjusting the impedance of the corresponding data transmission line.

Each of the drives 10a to 10h has a power source 11, a disk enclosure (hereinafter referred to as "DE") 12, and a DE controller 13. The power source 11 supplies electric power to the DE 12 and the DE controller 13. The power source 11 has a breaker (not shown) for turning ON and OFF the power source.

The DE 12 incorporates magnetic disks (recording media), a rotation mechanism for rotating the magnetic disks, heads for executing a write/read operations on the magnetic disks, and a seek mechanism for carrying out a seek operation by the heads. The DE controller 13 controls the rotation of the disks, the positioning of the heads, and read/write operations according to instructions from the string controller 5.

The string controller 5 separately controls the drives 10a to 10h according to instructions from the magnetic disk controller 6, which controls the magnetic disk system as a whole.

The magnetic disk system of FIG. 1 is capable of accommodating more drives in addition to the drives 10a to 10h. These drives are replaceable one by one. It is frequently required to replace the drives without turning OFF the power supply of the whole magnetic disk system and without stopping the supply of electric power to the magnetic disk system. Accordingly, the power source 11 of each drive has the breaker, which is turned OFF when replacing the corresponding drive.

FIG. 2 is a diagram showing drives which are to be connected and disconnected according to the prior art.

In FIG. 2, drives 10a and 10b share a single power source and are connected in parallel with respect to a single data transmission line 50 composed of a pair of data transmission portions DATA, *DATA, through connectors 3, to reduce the cost of the whole computer system. In this case, each of the connectors 3 includes a connector unit 31 arranged in each of the drives, and another connector unit 32 arranged in the data transmission line 50.

Each of the drives 10a and 10b has a receiver (represented as "RV" in FIG. 2) 131 and a transmitter (a driver; represented as "DV" in FIG. 2) 132. The receiver 131 and transmitter 132 are connected to the data transmission line 50. The receiver 131 has transistors Tr1 and Tr2 that are activated to receive data (such data is represented as DATA and *DATA transmitted by the data transmission line 50). The transmitter 132 includes transistors Tr3 and Tr4, each of which has an open-collector and is activated to transmit data. The data transmission line 50 has a terminating resistor 4 to adjust the impedance of the data transmission line per se.

FIG. 3 is a diagram showing a pair of connector units implemented as the connector 3 of FIG. 2, which are connected to or disconnected from each other when the power source is under active state according to the prior art.

The connector unit 31 is attached to each of the drives 10a and 10b, and the connector unit 32 is attached to the data transmission line 50 (FIG. 2). The connector unit 31 has terminals ① to ⑦ of different lengths. On the other hand, the connector unit 32 has corresponding terminals of a uniform length. When the connector units 31 and 32 are coupled to each other, i.e., the connector unit 31 is inserted to the connector unit 32, the longest terminals ② and ④ in the connector unit 31, respectively having resistors Ra and Rb, engage with the corresponding terminals of the connector unit 32 first. Thereafter, the second longest terminals ① and ③ engage with corresponding terminals of the connector unit 32, and the data communication terminals ⑤, ⑥ and ⑦ each having the shortest length engage last.

In this active connection process, the power source (not shown in FIG. 3) is firstly connected with the resistors Ra and Rb relaxing (i.e., restricting) a rush current caused by a capacitor C, and then, the data communication terminals ⑤, ⑥ and ⑦ are coupled.

To connect, for example, the drive 10a of FIG. 2 under an active state, the power source is firstly connected to the receiver 131 and transmitter 132 of the drive 10a, and then, the data communication terminals of the drive 10a are connected to the data transmission line, through the connector units 31 and 32.

Before the drive 10a is connected to the data transmission line through the connector units 31 and 32, the bases of the transistors Tr1 and Tr2 and the collectors of the transistors Tr3 and Tr4 of the drive 10a are open. Accordingly, the output potential of the data communication terminals that are connected to these transistors is uncertain or decreases due to a leakage current in internal circuits of the drive 10a. When the drive 10a is connected under this state to the data transmission line through the connector units 31 and 32, the uncertain or decreased potential of the data communication terminals of the drive 10a fluctuates the level of the data transmission line, to thereby cause a malfunction in the drive 10b.

As a first method for avoiding such a malfunction, all the drives are classified into a number of groups, and each of the groups is provided with a power source. When a certain drive in a given group has to be replaced, the power source for the groups is turned OFF to deactivate the data communication terminals of the drive in question before replacing it.

Alternatively, as a second method for avoiding a malfunction, a plurality of data transmission lines are respectively arranged for the corresponding drives in each group of the drives that share a power source, so that any one of the drives may be replaced without cutting away (i.e., disconnecting) the power source and without stopping the supply of electric power to the remaining drives in a given group.

However, the following problems exist in the configuration of the prior art shown in FIGS. 1 through 3 and in the above-mentioned methods for avoiding a malfunction occurring in connecting and disconnecting drives under an active state to and from a data transmission line.

First, the configuration of the prior art, in which every drive is provided with a power source and a breaker, involves a lot of cost and needs a large space occupied by the whole storage system, e.g., the whole magnetic disk system. Namely, the configuration of the prior art is expensive and bulky.

Second, the first method of providing each group of drives with a power source and a transmission line may involve relatively low cost. In the first method, however, the breaker must be opened to deactivate all the drives in a group when one of the drives in the group has to be replaced.

Third, the second method of providing a group of drives with a power source and providing each drive in every group with a data transmission line may allow any drive to be replaced without cutting away the power source. The second method, however, involves complicated wiring of data transmission lines as well as complicated transmitters and receivers.

SUMMARY OF THE INVENTION

In view of the above-mentioned problems, the main object of the present invention is to provide an apparatus for connecting and disconnecting drives to and from a data transmission line under an active state, which enables to replace any one of the drives in a storage system of a computer system without adversely affecting the operations of the other drives.

A further object of the present invention is to provide an apparatus for connecting and disconnecting drives to and from a data transmission line under an active state, which enables to replace any one of the drives with a relatively simple circuit configuration and at a relatively low cost.

A still further object of the present invention is to provide an apparatus for connecting and disconnecting drives to and from a data transmission line under an active state, which enables to replace any one of the drives without necessity for complicated wiring of data transmission lines, complicated transmitters and receivers, and the like.

To attain the above objects, the apparatus for connecting and disconnecting drives has a plurality of drives connected in parallel with respect to the data transmission line; a plurality of data communication terminals provided for each of the drives, so as to be connected to the data transmission line and disconnected from the data transmission line; and means for fixing the levels of the data communication terminals when the terminals are open.

Preferably, the means for fixing the levels at the data communication terminals includes a plurality of resistors connected between the data communication terminals and a ground, the resistance of the resistors being determined not to disturb an impedance of the data transmission line.

Further, preferably, the apparatus for connecting and disconnecting drives to and from a data transmission line under an active state has a plurality of drives cascaded with respect to the data transmission line; data communication terminals provided for each of the drives, so as to be connected to the data transmission line and disconnected from the data transmission line; a current source provided for a transmitter in each of the drives; means for connecting a power source to any one of the drives at first when the drive is connected to the data transmission line; and means for connecting and activating the current source of the transmitter of the drive, to which the power source is connected, after the data communication terminals of the drive are connected to the data transmission line.

Further, preferably, the apparatus for connecting and disconnecting drives to and from a data transmission line under an active state has a plurality of drives connected in parallel with respect to the data transmission line; data communication terminals provided for each of the drives, so as to be connected to the data transmission line and disconnected from the data transmission line; a current source provided for each of a transmitter and a receiver in each of the drives; and means for activating the current sources of the transmitter and the receiver of any one of the drives after the data communication terminals of the drive are connected to the data transmission line.

Further, preferably, such apparatus further has means for connecting and activating the current source of any one of the drives when the data communication terminals of the drive are connected to the data transmission line.

Further, preferably, the apparatus for connecting and disconnecting drives to and from a data transmission line under an active state has a plurality of drives connected in parallel with respect to the data transmission line; data communication terminals provided for each of the drives, so as to be connected to the data transmission line and disconnected from the data transmission line; a current source provide for a transmitter in each of the drives; a load resistor provided for the current source; means for connecting a power source to any one of the drives at first when the drive is connected to the data transmission line; and means for connecting the load resistor of the current source in the transmitter of the drive, to which the power source is connected, after the data communication terminals of the drive are connected to the data transmission line.

Further, preferably, the apparatus for connecting and disconnecting drives to and from a data transmission line under an active state has a plurality of drives cascaded with respect to the data transmission line; data communication terminals provided for each of the drives, so as to be connected to the data transmission line and disconnected from the data transmission line; a current source provided for each of a transmitter and a receiver in each of the drives; a load resistor provided for the current source; and means for connecting the load resistor of each of the current sources in the transmitter and the receiver of any one of the drives after the data communication terminals of the drive are connected to the data transmission line.

Further preferably, such apparatus further has means for connecting the load resistor to the current source when the data communication terminals of the corresponding drive are connected to the data transmission line.

According to the apparatus of the present invention, when a connector of one drive among a plurality of drives is disconnected while the data transmission line is active, data communication terminals of the drive are grounded through resistors, and the potential of these terminals is fixed. On the other hand, when the connector of one drive among a plurality of drives is connected, the power source is first connected to the drive. At this time, the fixed potential of the data communication terminals of the drive is unchanged even if there is a leakage current in the transmitter or receiver of the drive.

Therefore, the level of the data transmission line will never fluctuate when the connector of the drive is connected to the data transmission line, and this prevents a malfunction in the drive.

BRIEF DESCRIPTION OF THE DRAWINGS

The above objects and features of the present inventions will be more apparent from the following description of the preferred embodiments with reference to the accompanying drawings, wherein.

DESCRIPTION OF THE PREFERRED EMBODIMENTS

Figure 1:
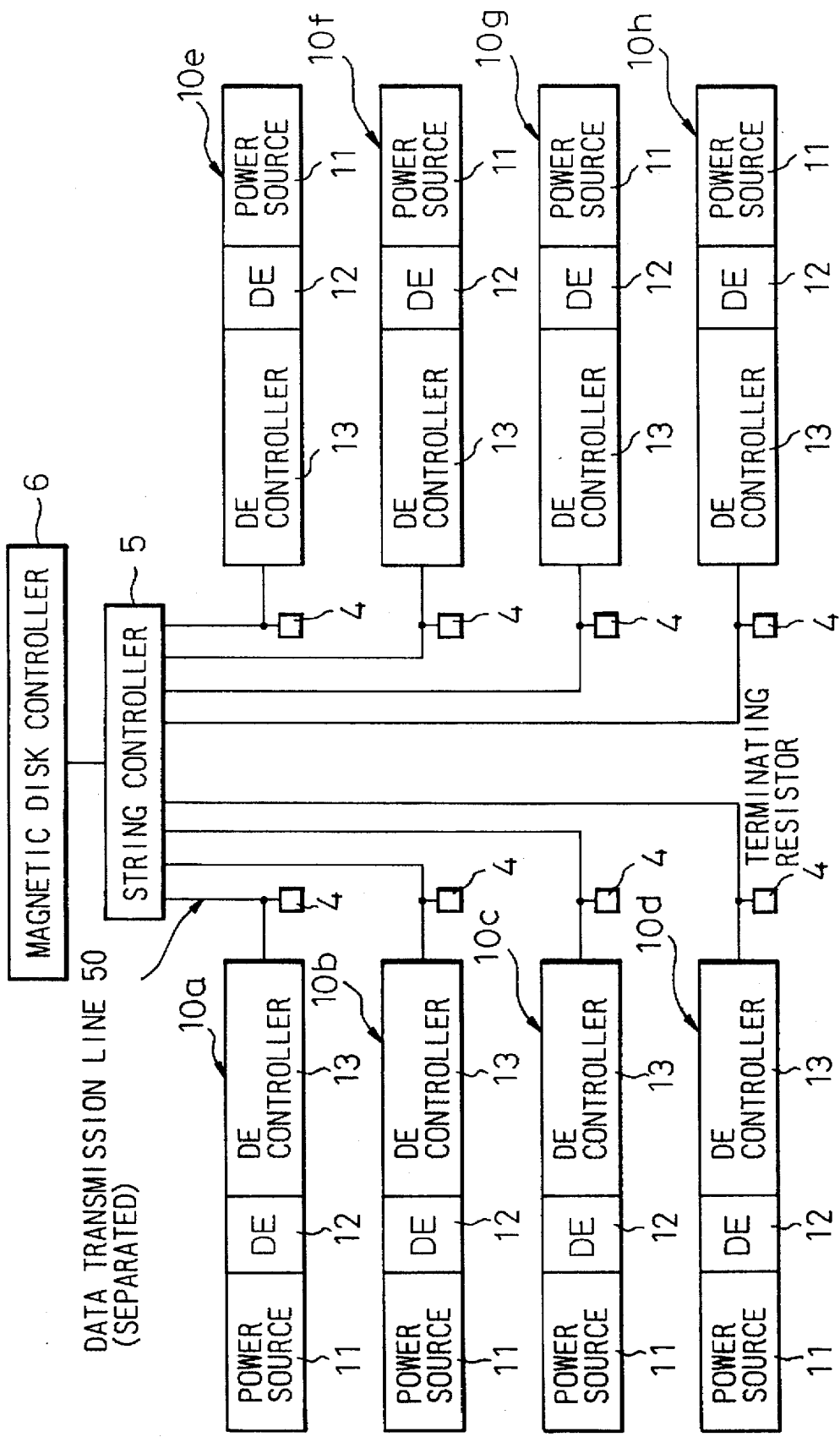
FIG. 1 is a block diagram showing a magnetic disk system of a computer system according to the prior art.
Figure 2:
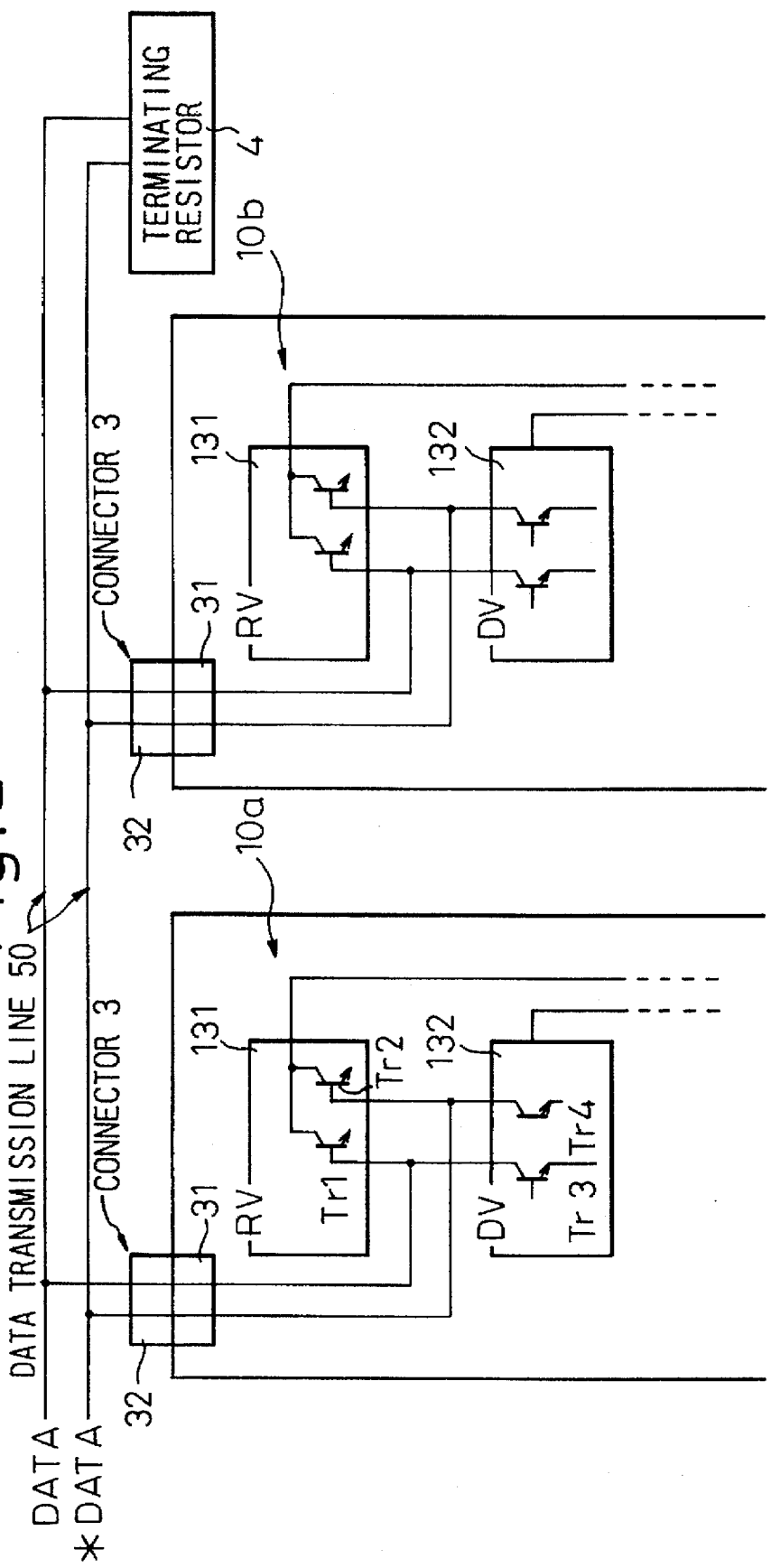
FIG. 2 is a circuit block diagram showing drives which are to be connected and disconnected according to the prior art.
Figure 3:
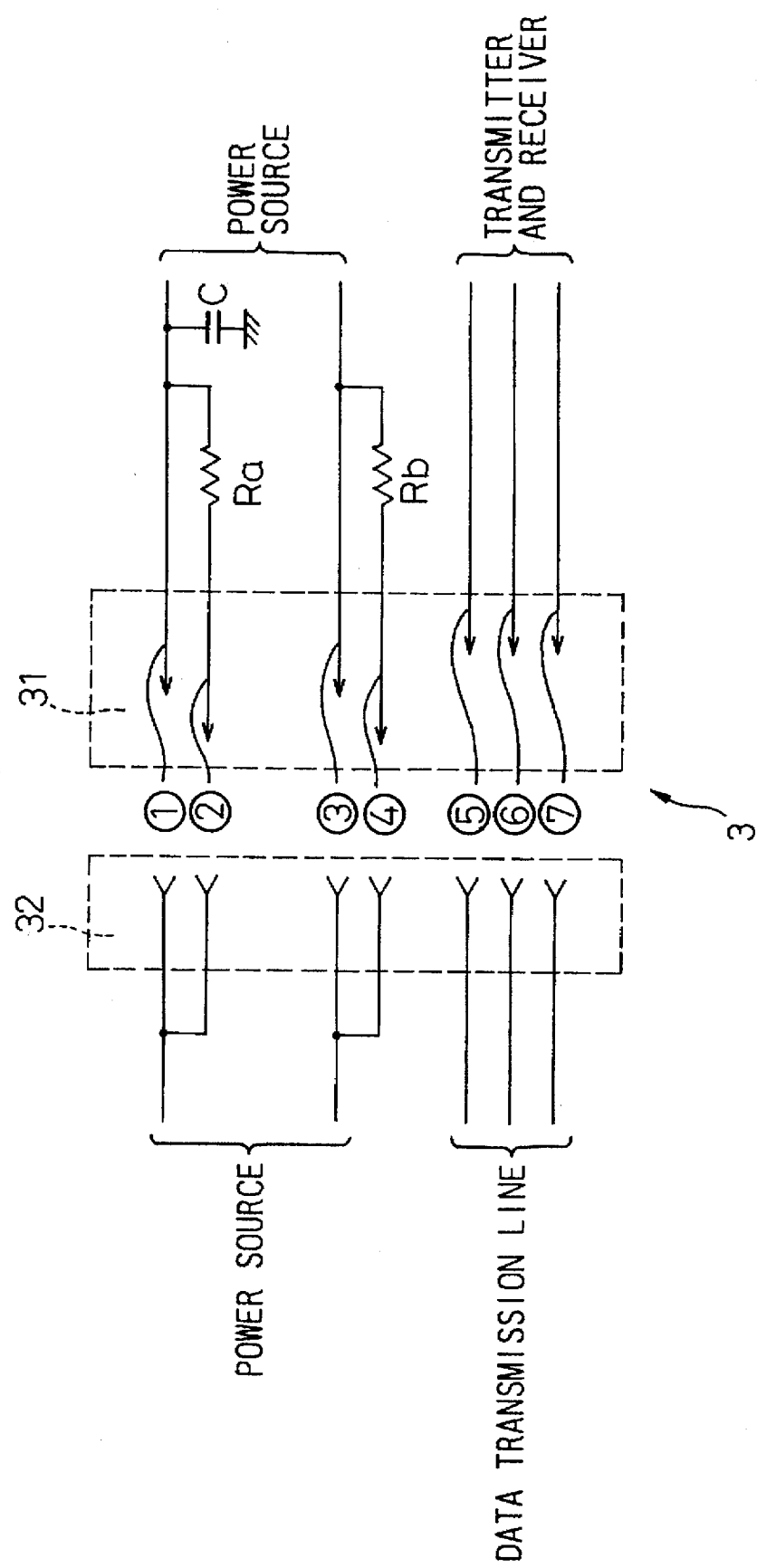
FIG. 3 is a diagram showing a pair of connector units in each of connectors, which are connected to or disconnected from each other when a power source is under active state according to the prior art.

Embodiments of the present invention will be explained with reference to FIGS. 4 through 12. In the figures, the parts that are the same as those in FIGS. 1 through 3 are represented with like reference numerals or marks.

Figure 4:
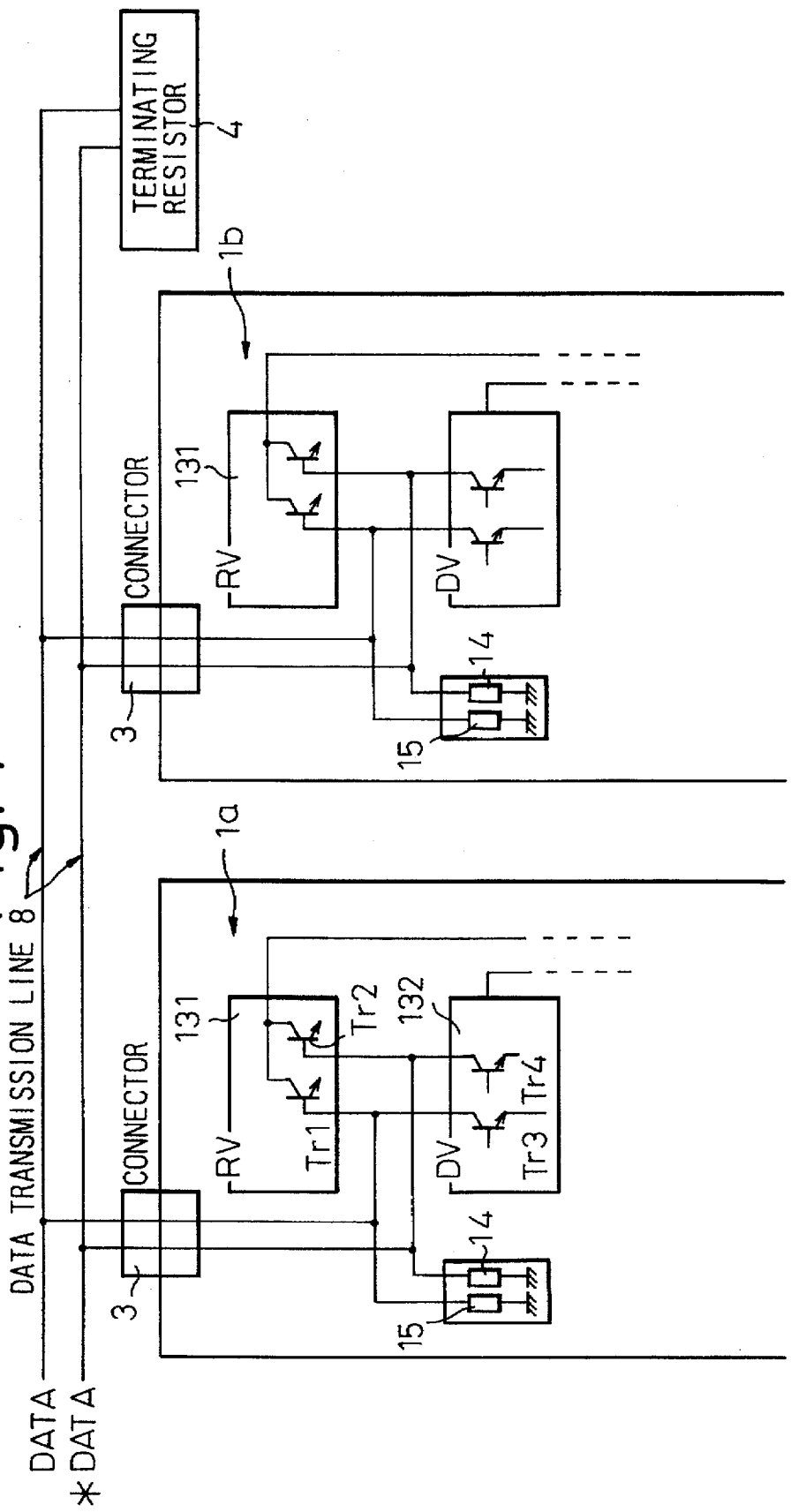
FIG. 4 is a block diagram showing an essential embodiment based on the principle of the present invention.

FIG. 4 is a block diagram showing an essential embodiment based on the principle of the present invention.

Drives 1a and 1b are connected to a data transmission line 8 composed of a pair of data transmission portions DATA, *DATA, through connectors 3.

Each of the drives 1a and 1b has a receiver 131, a transmitter (a driver) 132, and resistors 14 and 15.

The connector 3 enables the drive 1a or 1b to be disconnected without turning OFF a power source that is shared by the drives 1a and 1b. The resistors 14 and 15 are high-impedance pull-up resistors that fix the level of data communication terminals of a corresponding one of the drives 1a and 1b when the connector 3 of the drive is disconnected. The resistance of the resistors 14 and 15 is determined according to the resistance of a terminating resistor 4 so that it causes no disturbance (i.e., negligible change) in the impedance of the data transmission line 8. If the impedance (resistance) of the terminating resistor 4 is, for example, 65 ohm, the resistance of the resistors 14 and 15 will be about 10 kilo-ohm.

The operation of the arrangement of FIG. 4 will be explained.

Since the drives 1a and 1b share a single power source, the data transmission line 8 will be active if one of the drives 1a and 1b is using the data transmission line 8.

If the connector 3 of the drive 1a is disconnected while the data transmission line 8 is active, the data communication terminals of the drive 1a are grounded through the resistors 14 and 15, and the potential of these terminals is fixed. When the connector 3 of the drive 1a is first connected, the power source is connected to the drive 1a. At this time, the fixed potential of the data communication terminals of the drive 1a is unchanged even if there is a leakage current in the transmitter and receiver of the drive 1a.

Consequently, the level of the data transmission line 8 will never fluctuate when the connector 3 of the drive 1a is connected to the data transmission line 8, and this will prevent a malfunction in the drive 1b.

Figure 5:
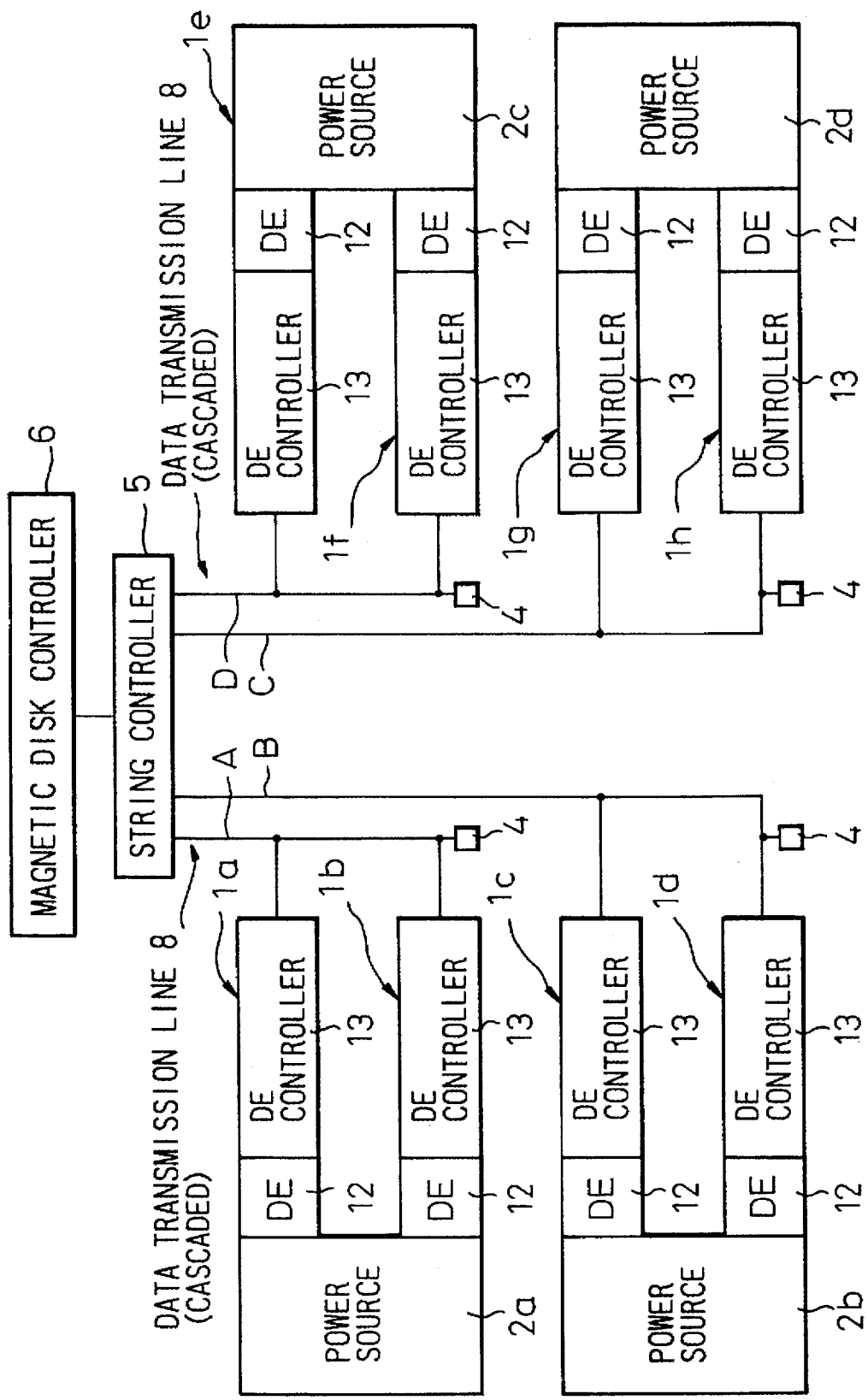
FIG. 5 is a block diagram showing a magnetic disk system to which the present invention is applied.

FIG. 5 is a block diagram showing a magnetic disk system to which the present invention is applied. A plurality of drives share a power source and one of the data transmission lines 8, to reduce the cost. In this case, to enable the description about each of the data transmission lines 8 to be easily made, the data transmission lines will be respectively represented by corresponding the letters A, B, C and D.

Namely, drives 1a and 1b share a power source 2a and are connected in parallel with respect to a data transmission line A. Drives 1c and 1d share a power source 2b and are cascaded with respect to a data transmission line B. Drives 1e and if share a power source 2c and are cascaded with respect to a data transmission line C. Drives 1g and 1h share a power source 2d and are cascaded with respect to a data transmission line D.

Each of the data transmission lines A to D has a terminating resistor 4 to adjust the impedance of the corresponding data transmission line. Each data transmission line is bidirectional, and therefore, another terminating resistor is arranged in a string controller 5.

Each of the drives 1a to 1h has a disk enclosure (represented as "DE" in FIG. 5) and a DE controller 13. The DE 12 incorporates magnetic disks, a rotation mechanism for rotating the magnetic disks, heads, and a seek mechanism for the heads. These elements are sealed in the DE 12. The DE controller 13 controls the DE 12 according to instructions from the string controller 5.

The string controller 5 separately controls the drives 1a to 1h according to instructions from a magnetic disk controller 6, which controls the system as a whole.

In FIG. 5, each pair of drives share one power source and one transmission line. The drive 1a, for example, is disconnected from the power source 2a or connected to the power source 2a, in a condition that the power source 2a remains active and the drive 1b is using the transmission line A.

Figure 6:
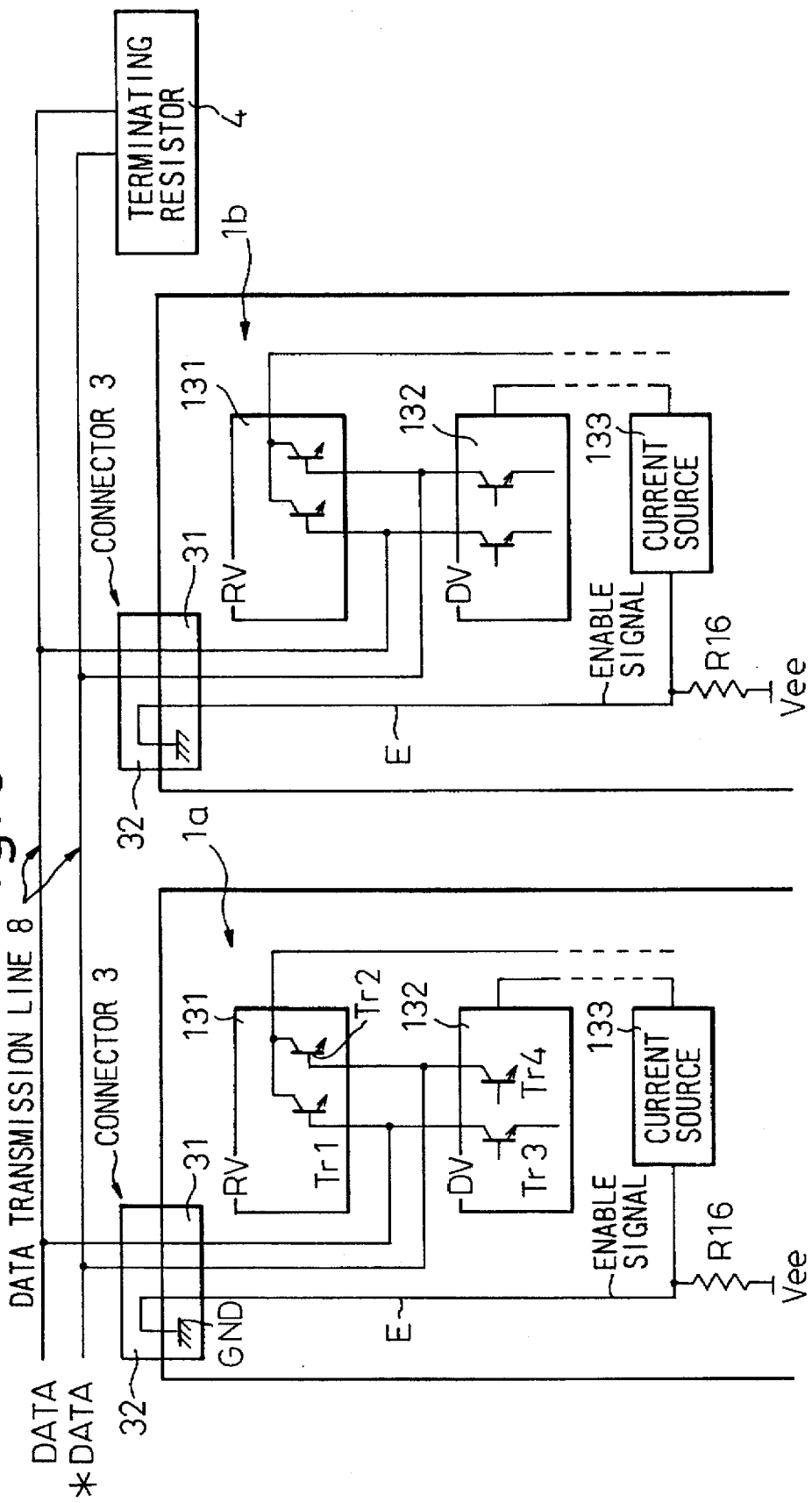
FIG. 6 is a diagram showing a first preferred embodiment of the present invention.

FIG. 6 is a diagram showing a first preferred embodiment of the present invention.

Just after a drive is connected to a power source, the voltages and currents of various parts of the drive become unstable and cause many malfunctions in a receiver and a transmitter in the drive. In particular, a malfunction in the transmitter is serious because it adversely affects the data transmission line to which the drive and other drives are connected. To avoid this, the first preferred embodiment enables the current sources for a receiver and a transmitter in a drive after the drive is connected to a power source.

Referring to FIG. 6, drives 1a and 1b share a power source 2a (FIG. 5) and are connected in parallel with respect to a data transmission line 8. Each of the drives 1a and 1b has a receiver 131 and a transmitter 132, and each of the receiver 131 and the transmitter 132 has a current source 133. The current source 133 has an enable terminal E. The enable terminal E is connected to a power source of negative potential (Vee) to disable, i.e., turn OFF the current source 133. After the receiver 131 and transmitter 132 are connected to the data transmission line 8, the enable terminal E is connected to an enable potential source such as a ground (GND).

The drive 1a, for example, is connected to the data transmission line 8 through connector units 31 and 32 under an active state. The connector unit 31 is attached to the drive, and the connector unit 32 is attached to the data transmission line 8. In this case, the drive 1a is first connected to the power source. The potential of the enable terminal E decreases, due to the power source of negative potential (Vee), to turn OFF the current source 133. After the drive 1a is connected to the power source, data communication terminals of the drive 1a are connected to the data transmission line 8 through the connector units 31 and 32. The enable terminal E is then grounded through the connector units 31 and 32, to provide the current source 133 with an enable signal at ground potential, thereby activating the current source 133. As a result, the receiver 131 and transmitter 132 start to operate.

In this way, the first preferred embodiment prevents malfunctions in the receiver 131 and transmitter 132 of a given drive just after the drive is connected to the power source, thereby preventing the drive from adversely affecting the other drives.

Figure 7:
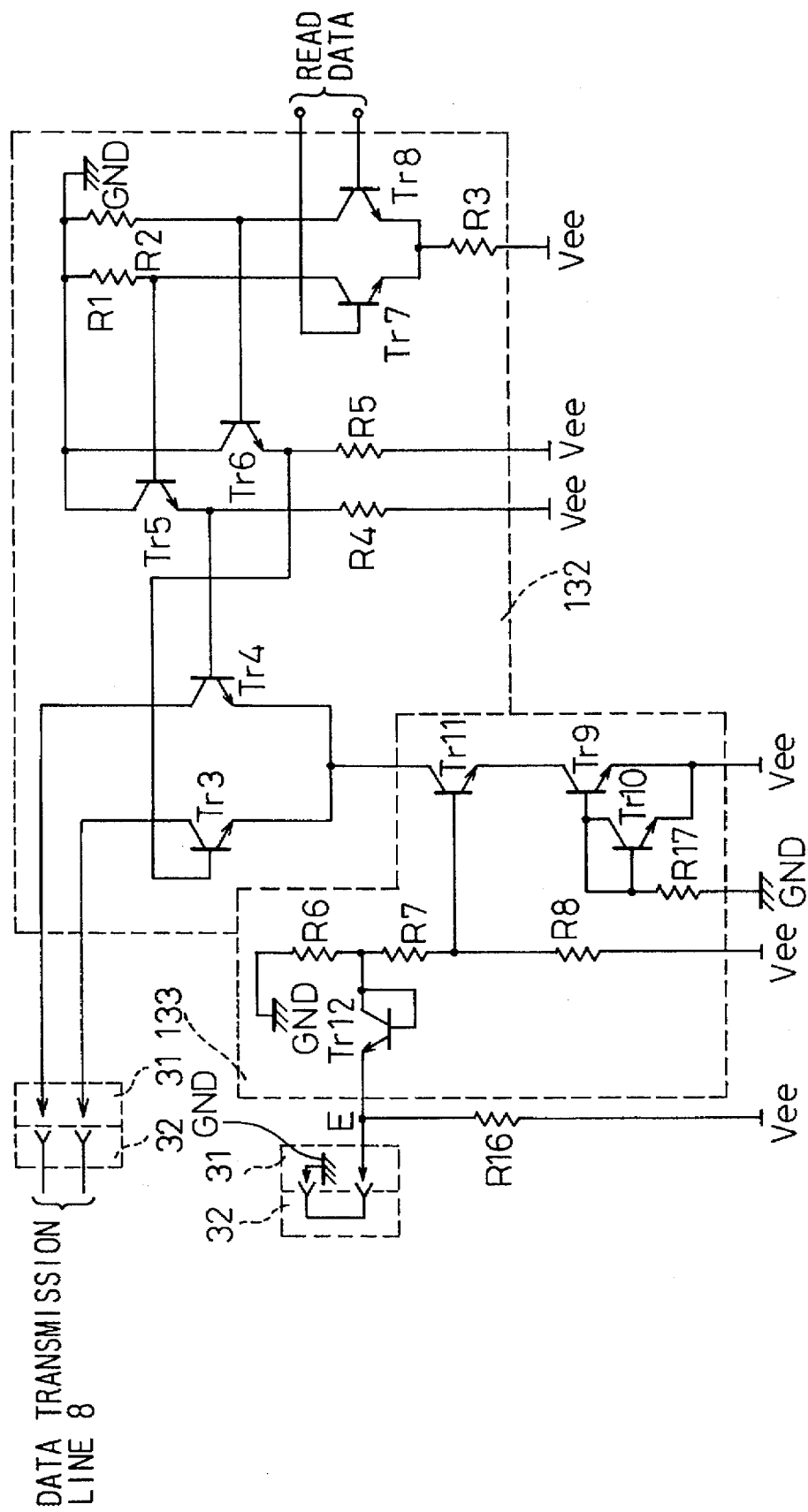
FIG. 7 is a circuit block diagram showing a transmitter according to the first preferred embodiment of the present invention.

FIG. 7 is a circuit block diagram showing a transmitter according to the first preferred embodiment of the present invention.

A reference mark GND represents ground potential, and Vee represents a negative power source of negative potential. Transistors Tr7 and Tr8 and resistors R1, R2, and R3 form a differential amplifier. Read data from the disk enclosure (DE) are passed through a peak detector and a level converter and are supplied to the bases of the transistors Tr7 and Tr8. The outputs of the collectors of the transistors Tr7 and Tr8 are supplied to the bases of transistors Tr5 and Tr6, respectively.

The transistors Tr5 and Tr6 and resistors R4 and R5 form an emitter follower. The levels of the outputs of the differential amplifier are changed by the emitter follower, and the outputs of the emitter follower are supplied to the bases of transistors Tr3 and Tr4, respectively.

The emitters of the transistors Tr3 and Tr4 are connected to the collector of a transistor Tr11 of the current source 133. The collectors of the transistors Tr3 and Tr4 transmit the data to the data transmission line 8 through the connector units 31 and 32.

The current source 133 includes a constant current circuit consisting of a load resistor R17, transistors Tr9 and Tr10, etc. The load resistor R17 determines the value of a constant current. The transistor Tr11 turns ON and OFF the constant current circuit. The base of the transistor Tr11 is connected to a node between resistors R7 and R8.

The resistors R6, R7, and R8 are connected in series between the ground GND and the negative power source Vee. A node between the resistors R6 and R7 is connected to a diode-connected transistor Tr12, which is connected to the enable terminal E. The enable terminal E is connected to the negative power source Vee through a resistor R16.

The ON-OFF operation of the transistor Tr11 will be explained. When the connector units 31 and 32, to which the enable terminal E is connected, are disconnected, the enable terminal E is connected to the negative power source Vee through the resistor R16, to turn ON the diode-connected transistor Tr12. This decreases the voltage of the node between the resistors R6 and R7. As a result, the voltage of the node between the resistors R7 and R8 decreases to turn OFF the transistor Tr11, so that the transistors Tr3 and Tr4 of the transmitter 132 are deactivated.

When the connector units 31 and 32 are connected, the enable terminal E is connected to the grounding GND through these connector units. When the enable terminal E is set to the ground potential, the transistor Tr12 is turned OFF to increase the voltage of the node between the resistors R6 and R7 as well as the voltage of the node between the resistors R7 and R8. As a result, the transistor Tr11 is turned ON to activate the transistors Tr3 and Tr4 of the transmitter 132.

The above explanation for the transmitter 132 is applicable to the receiver 131 if an ON-OFF transistor is provided for the current source of the receiver 131.

Figure 8:
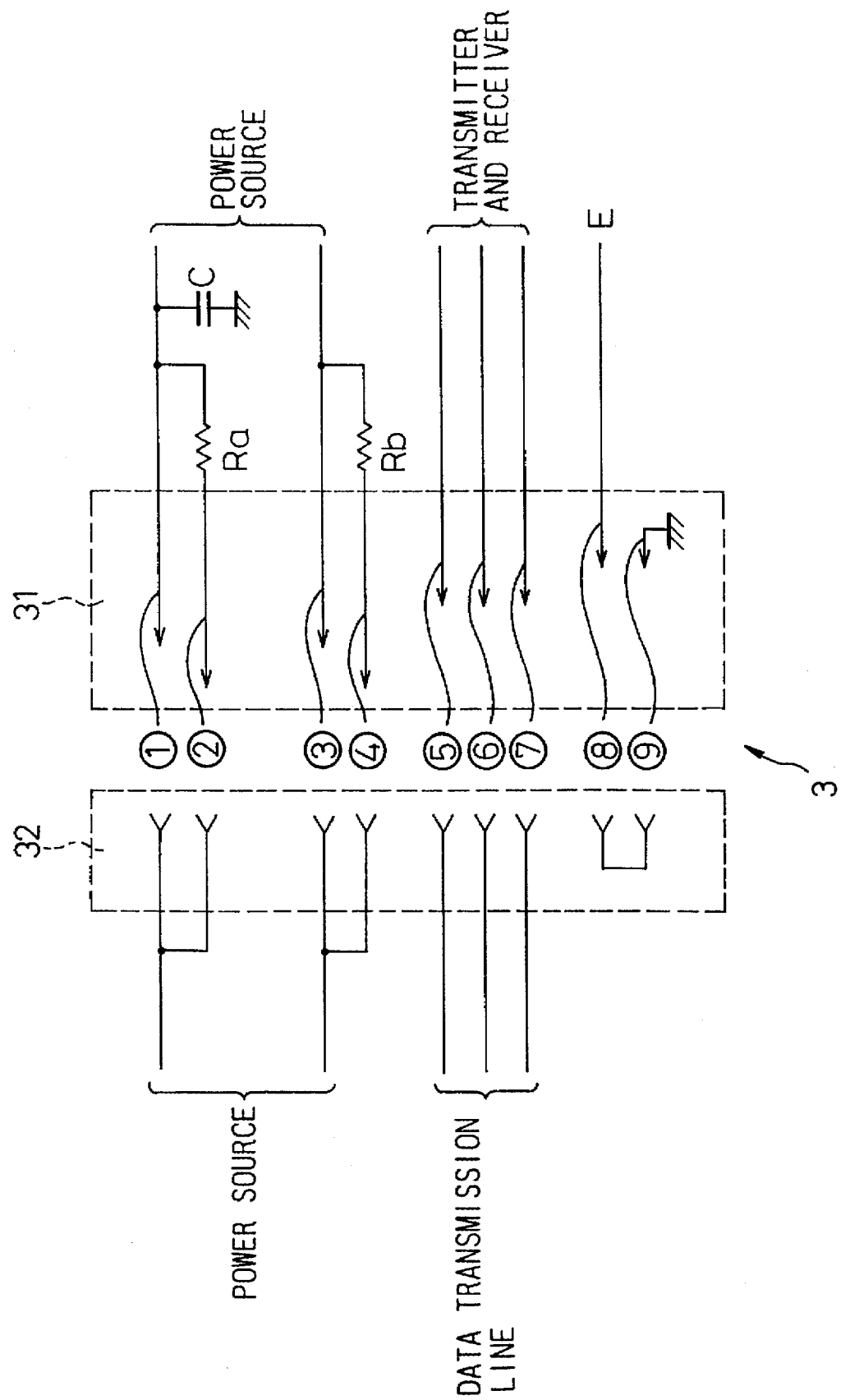
FIG. 8 is a diagram showing connectors according to the first preferred embodiment of the present invention.

FIG. 8 is a diagram showing connectors according to the first preferred embodiment of the present invention. The lengths of terminals ① to ⑨ of the connector unit 31 in each of connectors 3 (FIG. 6), which is provided for each of the drives, differ from one another. The connector unit 32 is provided for the data transmission line 8.

When the connector units 31 and 32 are coupled, the longest terminals ② and ④ having resistors Ra and Rb, respectively, engage first. Thereafter, the second longest terminals ① and ③ engage with the corresponding terminals of the connector unit 32. Subsequently, the data communication terminals ⑤, ⑥, and ⑦ being the third longest engage with corresponding terminals of the connector unit 32. Finally, the terminal ⑧ indicating the enable terminal E and the terminal ⑨ being the shortest engage last.

In an active connection process of a drive, the connector units 31 and 32 of the drive are connected, the resistors Ra and Rb relax a rush current from a capacitor C, etc., to the transmission line, the drive is connected to the power source, the receiver 131 and transmitter 132 of the drive are connected to the data transmission line 8, and the enable terminal E of the drive is grounded.

Although the length of the data communication terminals ⑤ to ⑦ differ from that of the enable terminal ⑧ and the terminal ⑨ connected to the enable terminal ⑧ (to simplify the explanation, both of the terminals ⑧ and ⑨ will be referred to as enable terminals hereinafter) in the connector unit 31, they may be equal to each other to simplify the structure of the connector units.

Figure 9:
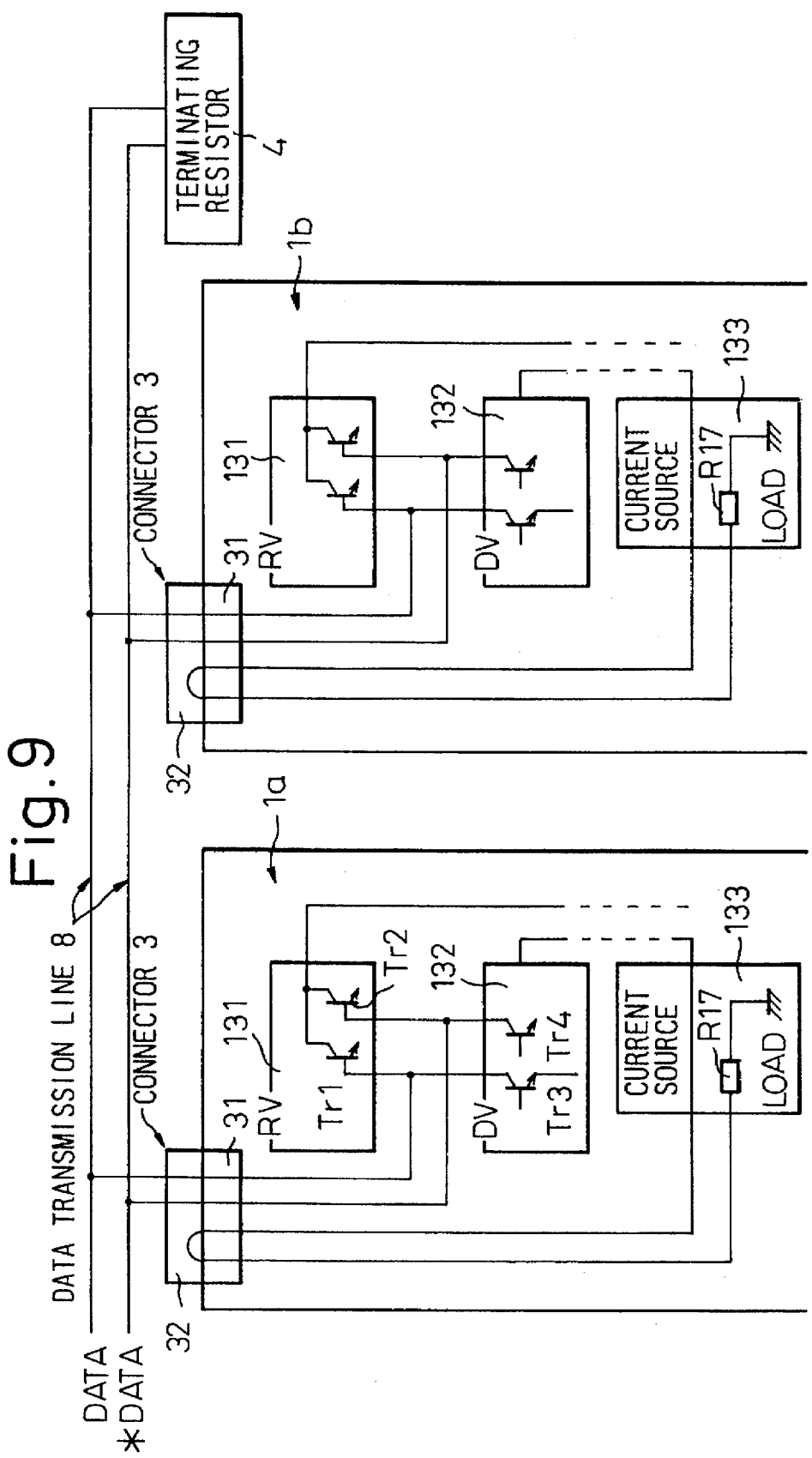
FIG. 9 is a diagram showing a second preferred embodiment of the present invention.

FIG. 9 is a diagram showing a second preferred embodiment of the present invention. The second preferred embodiment is simpler than the first preferred embodiment. Each of drives 1a and 1b has a transmitter 131 and a receiver 132, which have each a current source 133 having a load resistor R17. The load resistor R17 is connected to the current source 133 through connector units 31 and 32. To connect the drive 1a to a data transmission line 8 through the connector units 31 and 32, a power source is first connected to the drive 1a. At this time, the load resistor R17 is still disconnected from the current source 133, to prevent malfunctions in the receiver 131 and transmitter 132. Thereafter, data communication terminals of the drive 1a are connected to the data transmission line 8 through the connector units 31 and 32, and then, the load resistor R17 is connected to the current source 133 through the connector units 31 and 32, to activate the current source 133.

In this way, the simple structure of the second preferred embodiment prevents malfunctions in the receiver 131 and transmitter 132 of any one of the drives just after the drive is connected to the power source.

Figure 10:
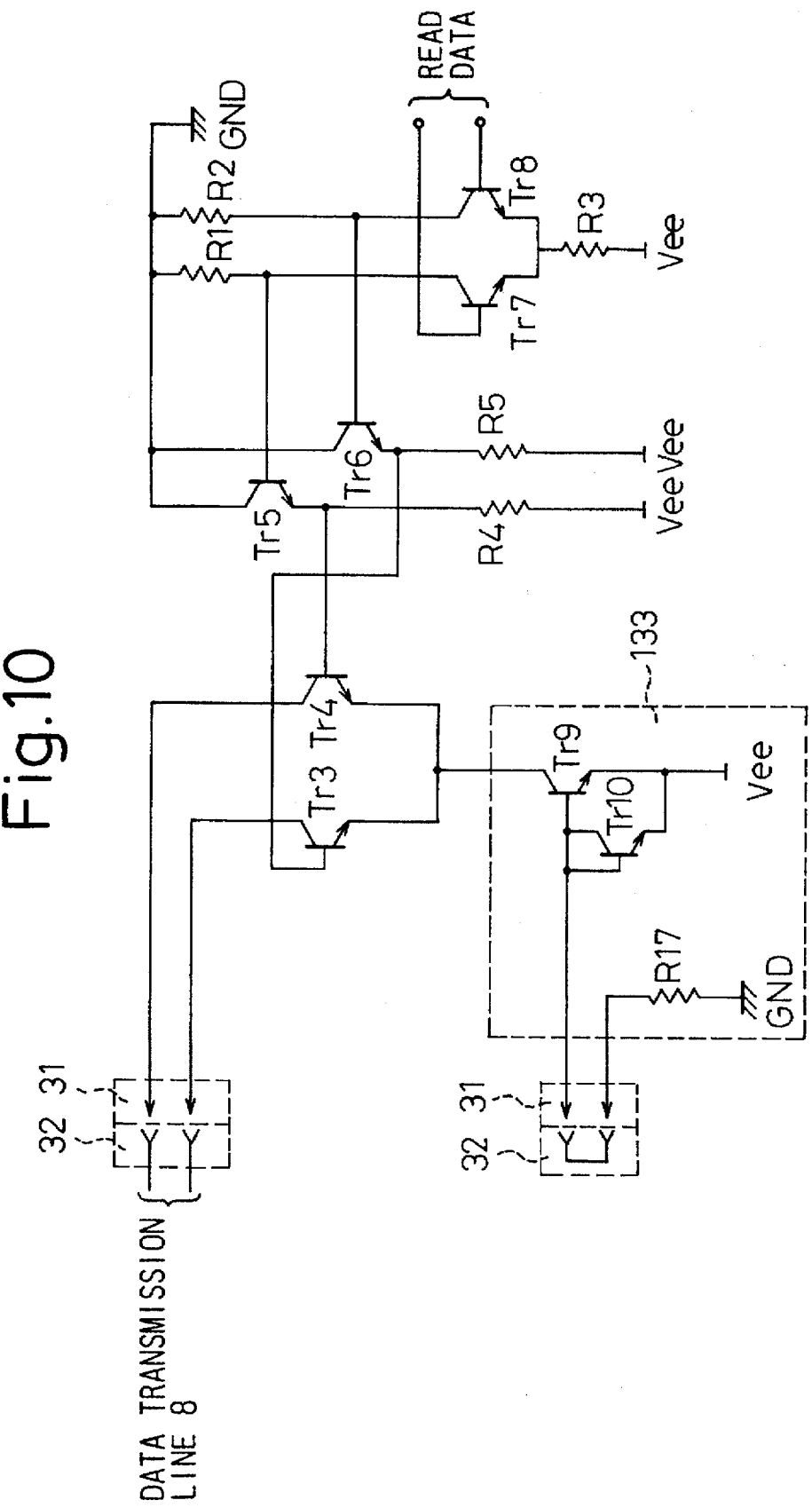
FIG. 10 is a diagram showing a transmitter according to the second preferred embodiment of the present invention.

FIG. 10 is a diagram showing a transmitter according to the second preferred embodiment of the present invention.

Instead of the transistor Tr11 for turning ON and OFF the constant current circuit of the current source 133 of FIG. 7, the second preferred embodiment of FIG. 10 connects and disconnects the load resistor R17 to and from the constant current circuit through the connector units 31 and 32.

In FIG. 10, transistors Tr7 and Tr8 and resistors R1, R2, and R3 form a differential amplifier. Read data from a disk enclosure (DE) are passed through a peak detector and a level converter and are supplied to the bases of the transistors Tr7 and Tr8. The collectors of the transistors Tr7 and Tr8 are connected to the bases of transistors Tr5 and Tr6, respectively.

The transistors Tr5 and Tr6 and resistors R4 and R5 form an emitter follower. The levels of the outputs of the differential amplifier are changed by the emitter follower, and the outputs of the emitter follower are supplied to the bases of transistors Tr3 and Tr4, respectively.

The emitters of the transistors Tr3 and Tr4 are connected to the collector of a transistor Tr9 of the current source 133. The collectors of the transistors Tr3 and Tr4 transmit the data to the data transmission line 8 through the connector units 31 and 32.

In the current source 133, the load resistor R17, transistors Tr9 and Tr10, etc., form a constant current circuit. The resistance of the load resistor R17 determines the value of a constant current. The load resistor R17 is connected to and disconnected from the constant current circuit through the connector units 31 and 32.

When the connector units 31 and 32 are disconnected, the constant current circuit is turned OFF to deactivate the transistors Tr3 and Tr4 of the transmitter 132.

When the connector units 31 and 32 are connected, a current from the ground flows to the transistors Tr9 and Tr10 through the resistor R17, to turn ON the constant current circuit and activate the transistors Tr3 and Tr4 of the transmitter 132.

The receiver 131 may also have a load resistor that is connected to and disconnected from the current source of the receiver 131 through the connector units 31 and 32. According to the second preferred embodiment, the connector units 31 and 32 have load-resistor terminals instead of the enable terminals ⑧ and ⑨ of FIG. 8, to connect the load resistor R17 to the constant current circuit when or after the data communication terminals ⑤ to ⑦ are connected.

Figure 11:
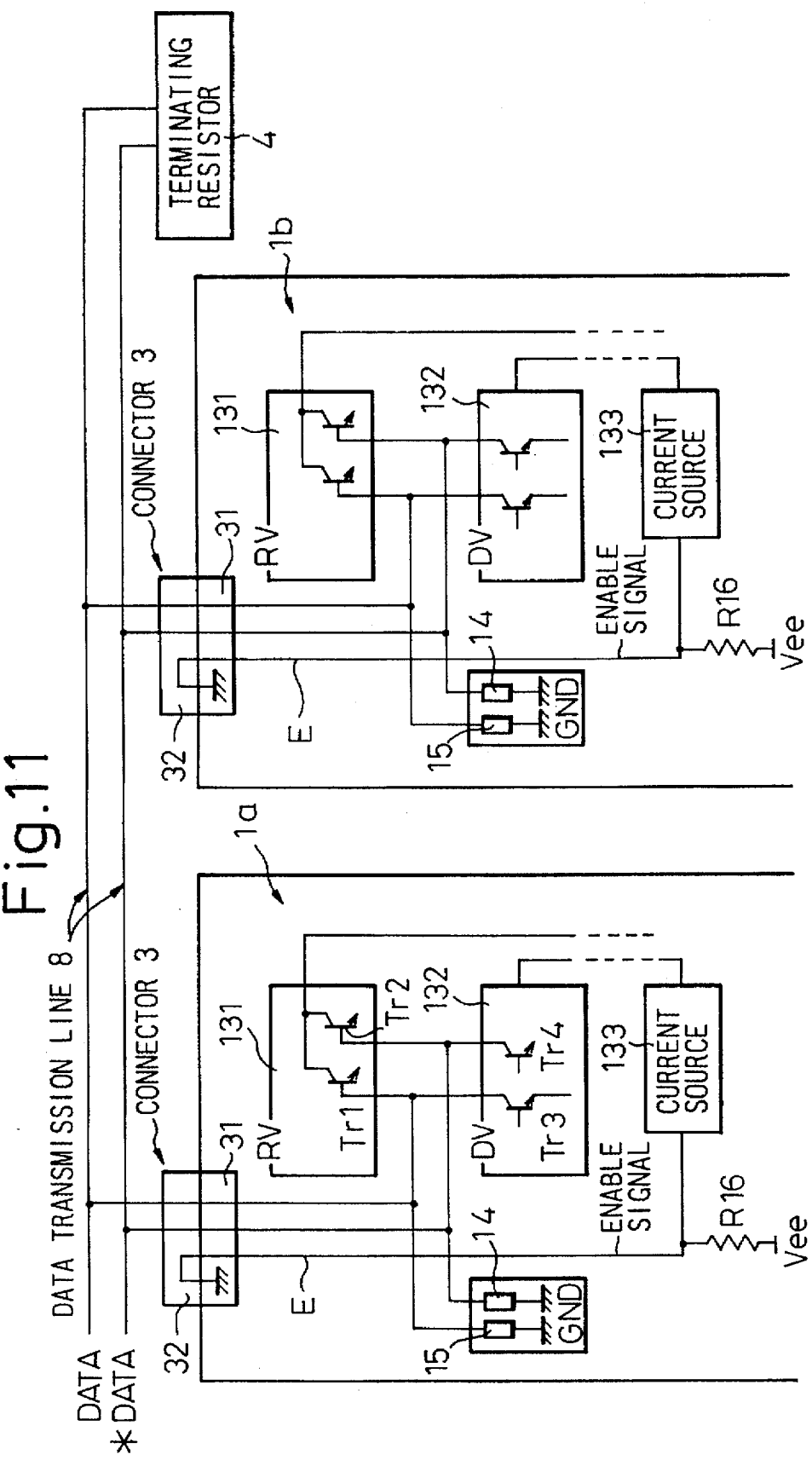
FIG. 11 is a diagram showing a third preferred embodiment of the present invention.

FIG. 11 is a diagram showing a third preferred embodiment of the present invention.

This preferred embodiment employs the resistors 14 and 15 of FIG. 4 for fixing the levels (potential) at the data communication terminals when they are open, as well as the enable terminal E of FIG. 6 for enabling the current source 133 of a transmitter or of a receiver. This preferred embodiment surely prevents a connection or disconnection process of an active drive from adversely affecting other drives.

In FIG. 11, the data communication terminals of each of drives 1a and 1b are connected to a ground GND through the high-impedance resistors 14 and 15. The impedance of the resistors 14 and 15 is determined not to disturb or alter the impedance of the data transmission line 8. The receiver 131 and transmitter 132 of each of the drives 1a and 1b each have the current source 133 having an enable terminal E. The enable terminal E is connected to a negative power source Vee through a resistor R16. The negative power source Vee turns OFF the current source 133.

When the drive 1a, for example, is connected to the data transmission line 8 through connector units 31 and 32, a power source is first connected to the drive 1a. At this time, the enable terminal E is connected to the negative power source Vee, and the data communication terminals are grounded.

Thereafter, the data communication terminals of the drive 1a are connected to the data transmission line 8 through the connector units 31 and 32, and the enable terminal E is grounded through the connector units 31 and 32.

Consequently, an enable signal of ground potential is supplied to the current source 133, which activates the corresponding transmitter 132 or receiver 131.

In this way, this preferred embodiment surely prevents a connection or disconnection process of the active drive 1a from adversely affecting the other drive 1b.

Figure 12:
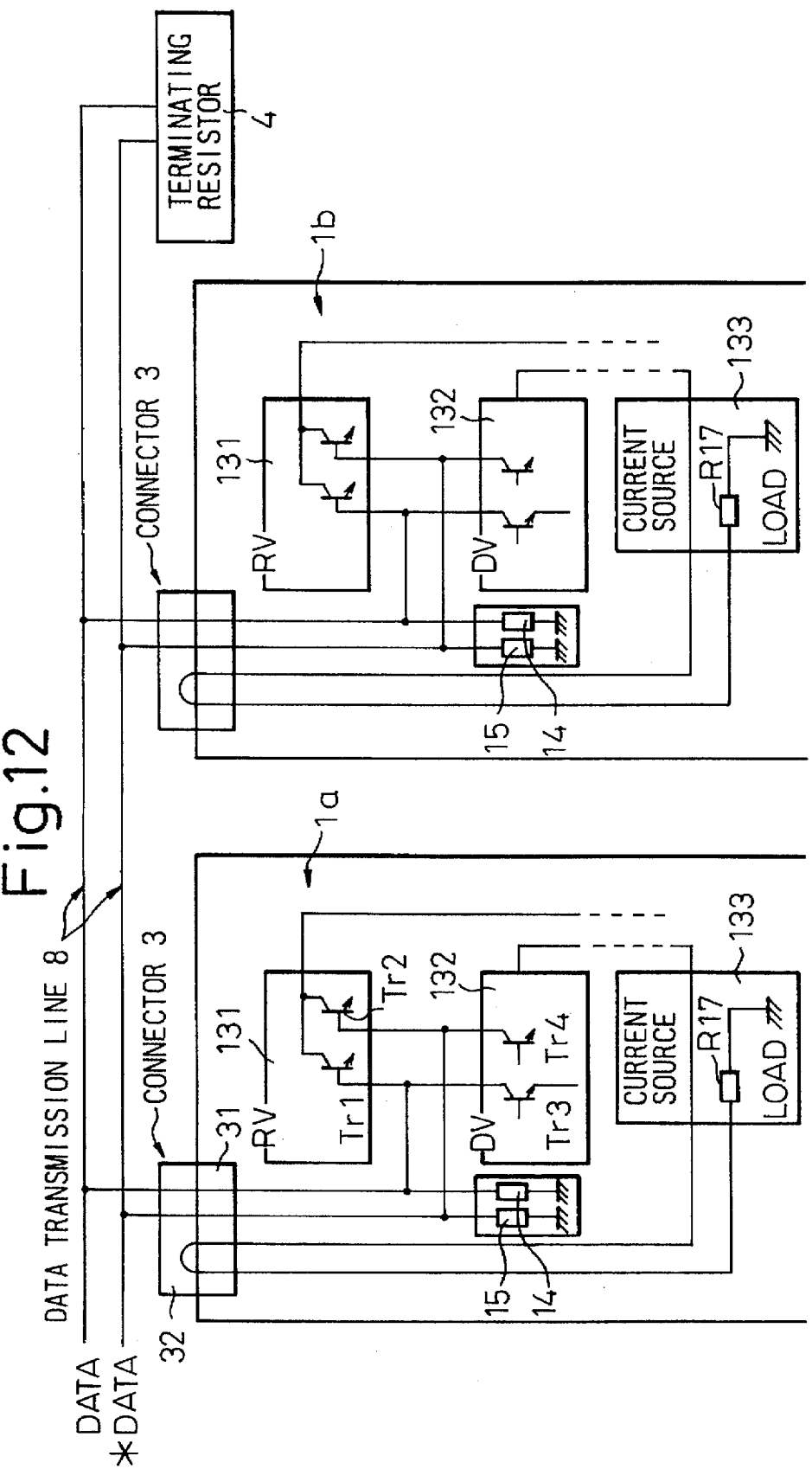
FIG. 12 is a diagram showing a fourth preferred embodiment of the present invention.

FIG. 12 is a diagram showing a fourth preferred embodiment of the present invention.

This preferred embodiment employs the resistors 14 and 15 of FIG. 4 to fix the levels at data communication terminals when they are open, as well as the arrangement of FIG. 9 to connect and disconnect the load resistor R17 to and from the current source 133 of a receiver or of a transmitter through the connector units 31 and 32. This preferred embodiment surely prevents a connection or disconnection process of an active drive from adversely affecting the other drives.

The data communication terminals of each of drives 1a and 1b are grounded through the high-impedance resistors 14 and 15. The impedance of the resistors 14 and 15 is determined not to disturb or alter the impedance of the data transmission line 8. The receiver 131 and transmitter 132 of each of the drives 1a and 1b each have the load resistor R17, which is connected to the current source 133 through the connector units 31 and 32.

When the drive 1a, for example, is connected to the data transmission line 8 through the connector units 31 and 32, a power source is first connected to the drive 1a. Then, the data communication terminals of the drive 1a are connected to the data transmission line 8 through the connector units 31 and 32. At this time, the data communication terminals are grounded to never fluctuate the level of the data transmission line 8.

The load resistor R17 is connected to the current source 133 through the connector units 31 and 32, to activate the current source 133, which activates the corresponding transmitter 132 or receiver 131.

In this way, the fourth preferred embodiment provides a simple circuit to prevent an active connection or disconnection process of the drive 1a from adversely affecting the drive 1b.

A data transmission line is adversely affected usually by a malfunction in a transmitter. Accordingly, the arrangement of ON-OFF switching operation may be applied only to the current source of each transmitter, to simplify the structure.

In summary, the present invention provides the following effects.

(1) In a magnetic disk system employing a plurality of drives that share a power source and are connected in parallel with respect to a data transmission line, the present invention enables, at a low cost, any one of the drives to be connected to the data transmission line or disconnected from the transmission line under an active state.

(2) The present invention fixes the levels at data communication terminals of a drive when the terminals are disconnected from the data transmission line, to prevent fluctuations in the level of the data transmission line when the terminals are connected to the data transmission line.

(3) The present invention activates a current source in a transmitter and in a receiver of a drive only after the data communication terminals of the drive are connected to the data transmission line, to prevent malfunctions in the transmitter and receiver just after the drive is connected to a power source.

(4) The present invention activates a current source in a transmitter and in a receiver of a drive when data communication terminals of the drive are connected to the data transmission line, to simplify the structure of connectors that are connected to and disconnected from each other under an active state.

(5) The present invention connects a load resistor to a current source in a transmitter and in a receiver of a drive when or after the data communication terminals of the drive are connected to the data transmission line, to activate the current source. This simplifies a circuit for realizing an active connection or disconnection operation.

(6) The present invention fixes the levels at data communication terminals of a drive when the drive is disconnected from the data transmission line, and activates a current source in a transmitter and in a receiver of the drive when or after the data communication terminals are connected to the data transmission line. This surely prevents an active connection or disconnection operation of a drive from adversely affecting the other drives.

(7) The present invention fixes the levels at data communication terminals of a drive when the drive is disconnected from the data transmission line, and connects a load resistor to a current source in a receiver and in a transmitter when or after the data communication terminals of the drive are connected to the data transmission line. This arrangement is simple and surely prevents an active connection or disconnection operation of a drive from causing malfunctions in the other drives.

(8) The present invention activates a current source in a transmitter of a drive when or after data communication terminals of the drive are connected to the data transmission line. This simplifies a circuit for realizing an active connection or disconnection operation.

While the present invention has been described as related to some preferred embodiments, it will be understood that various changes and modifications may be made without departing from the spirit and the scope of the invention as hereinafter claimed.

We claim:

1. An apparatus for connecting and disconnecting drives to and from a data transmission line under an active state, comprising:

a plurality of drives removably connected in parallel to said data transmission line;

data communication terminals provided for each of said drives, so as to be connected to said data transmission line and disconnected from said data transmission line;

a transmitter provided for each of said drives and connected to said data communication terminals via a transmission transistor;

an activation transistor for controlling the activation state of said transmission transistor; and means for deactivating said transmission transistor to fix the levels at said data communication terminals when said data communication terminals are open;

said means for deactivating comprising resistors connected between said data communication terminals and a ground, the resistance of each of said resistors being determined not to disturb an impedance of said data transmission line when said data communication terminals are closed, a potential between said resistors maintaining said activation transistor in an on state when said communication terminals are closed, said resistors including a pull down resistor for changing said potential to turn off said activation transistor and deactivate said transistor pair to thereby fix the levels when said data communication terminals are open.

2. An apparatus for connecting and disconnecting drives to and from a data transmission line under an active state, comprising:

a plurality of drives removably connected in parallel to said data transmission line;

data communication terminals provided for each of said drives, so as to be connected to said data transmission line and disconnected from said data transmission line;

a transmitter provided in each of said drives and connected to said data communication terminals via a transmission transistor;

a current source provided for said transmitter in each of said drives;

an activation transistor connected to said transmission transistor and said current source in each of said drives;

means for connecting a power source to any one of said drives at first when said drive is connected to said data transmission line; and an enable terminal connected to a negative potential in each of said drives for turning on said activation transistor to activate said current source and said transmission transistor after said data communication terminals of said drive are connected to said data transmission line.

3. An apparatus for connecting and disconnecting drives to and from a data transmission line under an active state, comprising:

a plurality of drives removably connected in parallel to said data transmission line;

data communication terminals provided for each of said drives, so as to be connected to said data transmission line and disconnected from said data transmission line;

a transmitter and a receiver in each of said drives connected to said data communication terminals;

a current source provided for each said transmitter and a receiver in each of said drives; and means for activating said current sources to activate said transmitter and said receiver of said one of drives after said data communication terminals of said drive are connected to said data transmission line.

4. An apparatus for connecting and disconnecting drives to and from a data transmission line under an active state, comprising:

a plurality of drives removably connected in parallel to said data transmission line;

data communication terminals provided for each of said drives, so as to be connected to said data transmission line and disconnected from said data transmission line;

a transmitter provided in each of said drives and connected to said data communication terminals via a transmission transistor;

a current source provided for said transmitter in each of said drives;

a load resistor provided for said current source; and means for connecting a power source to any one of said drives at first when said drive is connected to said data transmission line;

said load resistor being connected to said current source through said data communication terminals in said transmitter of said one of said drives when said data communication terminals of said one of said drives are connected to said data transmission line, thereby activating said current source and said transmission transistor to activate said transmitter.

5. An apparatus for connecting and disconnecting drives to and from a data transmission line under an active state, comprising:

a plurality of drives removably connected in parallel to said data transmission line;

data communication terminals provided for each of said drives, so as to be connected to said data transmission line and disconnected from said data transmission line;

a transmitter and a receiver provided in each of said drives and connected to said data communication terminals;

a current source provided for said transmitter and a receiver in each of said drives;

a load resistor provided for said current source; and means for connecting said load resistor to said current sources in said transmitter and said receiver of said one of said drives after said data communication terminals of said drive are connected to said data transmission line, said connecting of said load resistor activating said current source to activate said transmitter and said receiver.

6. An apparatus for connecting and disconnecting drives to and from a data transmission line under an active state, comprising:

a plurality of drives removably connected in parallel to said data transmission line;

data communication terminals provided for each of said drives, so as to be connected to said data transmission line and disconnected from said data transmission line;

means for fixing the levels at said data communication terminals when said terminals are open;

a transmitter provided in each of said drives and connected to said data communication terminals via a transmission transistor;

a current source provided for said transmitter in each of said drives;

an activation transistor connected to said current source and said transmission transistor in each of said drives;

means for connecting a power source to any one of said drives at first when said one of said drives is connected to said data transmission line; and a pull down resistor for turning on said activation transistor in said one of said drives to thereby activate said transmission transistor and said current source after said data communication terminals of said one of said drives are connected to said data transmission line.

7. An apparatus for connecting and disconnecting drives to and from a data transmission line under an active state, comprising:

a plurality of drives removably connected in parallel to said data transmission line;

data communication terminals provided for each of said drives, so as to be connected to said data transmission line and disconnected from said data transmission line;

means for fixing the levels at said data communication terminals when said terminals are open;

a transmitter and receiver provided in each of said drives and connected to said data communication terminals;

a current source provided for each of a transmitter and a receiver in each of said drives; and means for activating said current sources to activate said transmitter and said receiver of said one of said drives after said data communication terminals of said one of said drives are connected to said data transmission line.

8. An apparatus for connecting and disconnecting drives to and from a data transmission line under an active state, comprising:

a plurality of drives removably connected in parallel to said data transmission line;

data communication terminals provided for each of said drives, so as to be connected to said data transmission line and disconnected from said data transmission line;

means for fixing the levels at said data communication terminals when said terminals are open;

a transmitter in each of said drives and connected to said communication terminals via transmission transistor;

a current source provided for said transmitter in each of said drives;

a load resistor provided for said current source; and means for connecting a power source to any one of said drives at first when said one of said drives is connected to said data transmission line;

said load resistor being connected to said current source through said data communication terminals in said transmitter of said one of said drives when said data communication terminals of said one of said drives are connected to said data transmission line thereby activating said current source and said transmission transistor to activate said transmitter.

9. An apparatus for connecting and disconnecting drives to and from a data transmission line under an active state, comprising:

a plurality of drives removably connected in parallel to said data transmission line;

data communication terminals provided for each of said drives, so as to be connected to said data transmission and disconnected from said data transmission line;

means for fixing the levels at said data communication terminals when said terminals are open;

a transmitter and a receiver provided in each of said drives and connected to said communication terminals;

a current source provided for each of said transmitter and receiver in each of said drives;

a load resistor provided for said current source; and means for connecting said load resistor to said current source in each of said transmitter and said receiver of any one of said drives after said data communication terminals of said drive are connected to said data transmission line, said connecting of said load resistor activating said current source to activate said transmitter and said receiver.

* * * * *

UNITED STATES PATENT AND TRADEMARK OFFICE
CERTIFICATE OF CORRECTION

PATENT NO. : 5,689,655
DATED : November 18, 1997
INVENTOR(S) : Tanaka et al.

It is certified that error appears in the above-identified patent and that said Letters Patent is hereby corrected as shown below:

```
Column 6, line 42, delete "and if" and insert --and 1f-- therefor
Column 9, line 2, before "To connect the drive..." start a new
     paragraph
Column 9, line 7, before "Thereafter, data..." start a new paragraph
Column 12, line 45, delete "taming" and insert --turning-- therefor
Column 14, line 50, after "transmission" insert --line--
```

Signed and Sealed this

Fifteenth Day of September, 1998

Attest:

BRUCE LEHMAN

Attesting Officer      Commissioner of Patents and Trademarks